(No Model.)
L. COFFMAN.
CARPET STRETCHER.
No. 472,434. Patented Apr. 5, 1892.
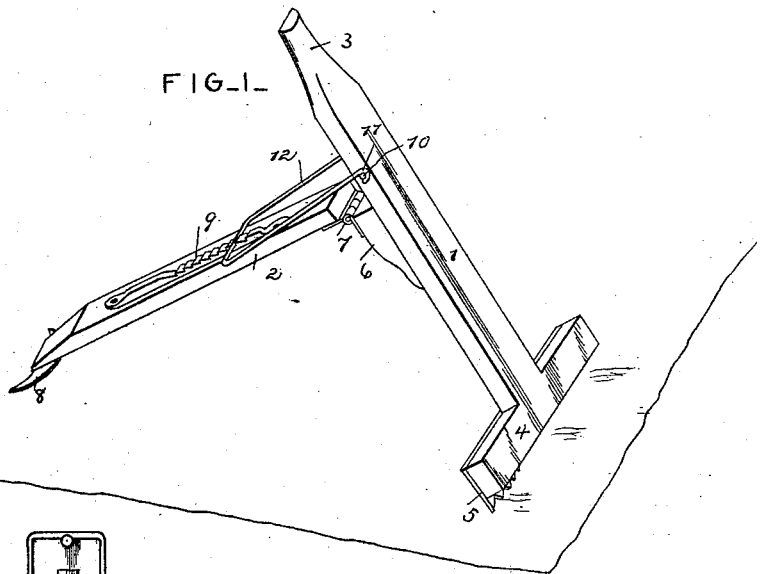
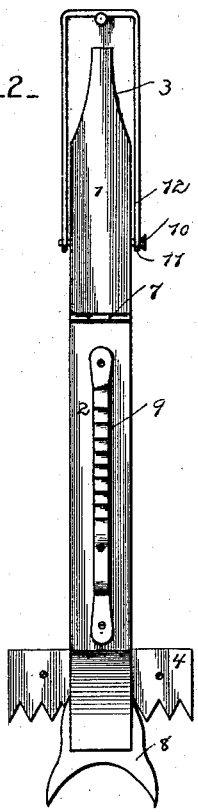
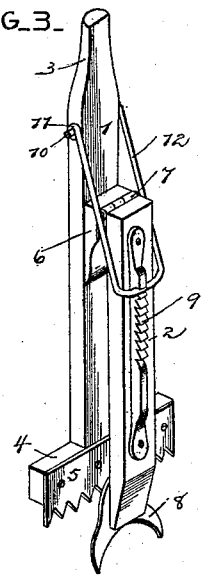
Witnesses:
B. S. Ober
W. S. Duvall
Inventor
Lucinda Coffman
By her Attorneys,
C. A. Snow & Co United States Patent Office.

LUCINDA COFFMAN, OF MONROE CITY, MISSOURI.

CARPET-STRETCHER.

SPECIFICATION forming part of Letters Patent No. 472,434, dated April 5, 1892.

Application filed April 15, 1891. Serial No. 389,047. (No model.)

*To all whom it may concern:*

Be it known that I, LUCINDA COFFMAN, a citizen of the United States, residing at Monroe City, in the county of Monroe and State of Missouri, have invented a new and useful Carpet-Stretcher, of which the following is a specification.

My invention relates to improvements in carpet-stretchers, the objects in view being to provide a carpet-stretcher of cheap and simple construction and which is effective in operation and capable of being locked in a folded position, so as to be set aside without danger of opening or suspended from a nail in the wall.

Other objects and advantages of the invention will appear in the following description, and the novel features thereof will be particularly pointed out in the claims.

Referring to the drawings, Figure 1 is a perspective of a carpet-stretcher constructed in accordance with my invention, the same being in operative position. Fig. 2 is a front elevation, the stretcher folded and suspended upon a nail. Fig. 3 is a perspective, the stretcher folded and the anchoring and stretching members being secured together, so that the device as a whole is adapted to be stood up in a corner or other out-of-the-way place.

Like numerals of reference indicate like parts in all the figures of the drawings.

In practicing my invention I employ the two members usual—namely, the stretching or lever member 1 and the anchoring or fulcrum member 2, preferably formed of wood. The member 1 is considerably longer than the member 2 and at its upper end is reduced to form a suitable hand-hold 3, and at its lower end is a transverse head 4, to which is secured a series of teeth or claws 5, forming a claw-bar. Upon its front face the member 1 is provided with a block 6, to which is hinged, as at 7, the member 2, whereby said members may be spread or closed or folded one upon the other. The member 2 is provided at its free end with an anchoring-claw 8, and upon its front face is secured a rack-bar 9, the teeth of which are disposed toward the free end of the member. Upon a pin 10, passed through the member 1 a short distance above the hinge 7, are loosely mounted the eyes 11, formed at the upper end of the two terminals of a U-shaped bail 12. This bail acts in the same manner as a gravity-pawl, and when the members are spread engages with the teeth of the rack-bar. The length of the bail is such that when the two members are closed or folded the free ends thereof rest upon the upper curved end of the rack-bar just above the first teeth of the same, so that by slightly springing the bail the free end of the same may be made to engage with the first tooth of the bar, and thus the two members are locked together against possible accidental separation and the device may be inverted and stood in a corner, in which position it will be out of the way and the claws not liable to injure the floor or carpet. The bail is also sufficiently long to extend beyond the upper end of the member 1, and, as shown in Fig. 2, may, if desired, be hooked over a nail 13 or other similar device projecting from a wall or partition.

The operation of the stretcher will be well understood from the foregoing description, but may be briefly stated as follows: The bail is disengaged from the rack-bar, if it be in such engagement, and the anchoring-claw 8 is forced into the floor, while the claw 5 engages the loose edge of the carpet. Now by using the member 1 as a lever and the member 2 as a fulcrum the two members may be spread at their free ends and in this way the carpet stretched to its position, after which the stretcher may be released, and the bail, having moved over the teeth of the rack-bar, will engage with an adjacent tooth and thus lock the parts in their spread position.

A material feature of this stretcher resides in the fact that the operation of stretching is performed while in a standing position.

Having described my invention, what I claim is—

1. In a carpet-stretcher, the combination, with the lever member and the shorter fulcrum member, the two being hinged together between the ends of the former, of the rack-bar mounted on the fulcrum member and having a series of downwardly-disposed teeth, and a rack-bar engaging bail pivoted to the sides of the lever member and of such length as to terminate short of the teeth of the rack-bar when the two members are closed or folded and adapted to be sprung over the first tooth thereof when in such position, substantially as specified.

2. The combination, with the lever member 1 and the fulcrum member 2, hinged to the lever member between the ends of the latter, each terminating at their free ends in claws, of the rack-bar having a series of downwardly-disposed teeth, the upper one of which is provided with a curved upper face or shoulder, and the U-shaped bail, the terminals of which are pivoted to the opposite edges of the member 1 and of a length to extend above the end of the lever and to terminate upon the curved shoulder of the upper tooth of the rack-bar when the two members are closed and adapted to be sprung over said tooth when in this position, substantially as specified.

In testimony that I claim the foregoing as my own I have hereto affixed my signature in presence of two witnesses.

LUCINDA COFFMAN.

Witnesses:
M. M. BERRY,
J. KENDRICK.